Patented Nov. 16, 1948

2,454,099

UNITED STATES PATENT OFFICE 2,454,099

PROCESS FOR CLEAVING THE —S—S— GROUP IN DIALKYL DISULFIDES

Frank K. Signaigo, Brandywine Hundred, Del., assignor to E. I. du Pont de Nemours & Company, Wilmington, Del., a corporation of Delaware No Drawing. Application February 24, 1944, Serial No. 523,744

5 Claims. (Cl. 260—609)

This invention relates to catalytic methods for the conversion of organic sulfides.

Organic disulfides have become available as a result of recent advances in catalytic sulfur chemistry and methods for converting them to other useful products are, therefore, of considerable interest.

This invention has, accordingly, as an object an economical and practicable process for cleaving organic disulfides. Another object is the provision of a simple, practical method for cleaving organic disulfides with organic compounds having ethylenic unsaturation. A further object is to provide a catalytic method for cleaving aliphatic disulfides with organic compounds having ethylenic unsaturation. Additional objects will become apparent from an examination of the following description and claims.

These and other objects and advantages are accomplished by the hereindescribed invention which broadly comprises heating an organic compound having ethylenic unsaturation with an organic disulfide in the presence of a sulfactive hydrogenation catalyst.

By the expression "organic compound having ethylenic unsaturation," as employed herein and in the appended claims, is meant an organic compound which contains at least one —C=C— double bond which is not present in a benzene nucleus.

By the term "organic disulfide" as used herein and in the appended claims is meant a compound having the general formula R—S—S—R wherein the R substituents are hydrocarbon radicals.

Sulfactive hydrogenation catalysts are particularly defined in U. S. Patent 2,230,390.

In practicing this invention, an organic compound containing ethylenic unsaturation and an equimolar amount of an organic disulfide, together with a sulfactive hydrogenation catalyst are charged into a pressure reactor. The reactor is then heated and agitated until reaction is complete. The crude reaction mixture is cooled and filtered to remove the catalyst and the conversion products are recovered by conventional methods.

The examples which follow show in greater detail the practice of this invention. They are, however, not to be considered as limitations thereof, since many modifications may be made without departing from the spirit and scope of this invention. Unless otherwise specified, parts are by weight.

Example I

Sixty parts of di-n-butyl disulfide is charged into a steel autoclave together with 60 parts of benzene as a solvent and 10 parts of a cobalt sulfide catalyst. The autoclave is closed and charged with ethylene to an initial pressure of 800 lbs./sq. in. at 25° C. The autoclave is then agitated and heated at 175° C. for 6 hours, cooled, and discharged. The cooled reaction mixture is filtered and the filtrate submitted to fractional distillation. After removal of the benzene, there are obtained three liquid fractions as described below.

| Fraction | B. P., ° C. | Amount, Parts by Wt. | Sulfur Content, Per Cent |
|---|---|---|---|
|  | Mm. |  |  |
| 1 | 53/30 | 35 | 26.1 |
| 2 | 85-93/30 | 8 | 24.7 |
| 3 | 72-100/2 | 14 | 33.8 |
| Residue |  | 5 |  |

Fraction No. 1 appears to be rich in ethyl butyl sulfide. Fraction 3 contains 1,2-bis(butylthio)-ethane.

Example II

Forty parts of diethyl disulfide and 37 parts of octene-1 are charged into an autoclave together with 8 parts of cobalt sulfide catalyst and 80 parts of dioxane. The autoclave is sealed and heated at 175° C. for 6 hours. After cooling, the contents of the autoclave are filtered to remove the catalyst and subjected to vacuum distillation. After removal of the solvent by washing with water, there are obtained 70 parts of alkyl sulfides of which 38 parts boil higher than diethyl disulfide. Fractionation of this material yields the following products.

| Fraction | B. P., ° C. | Amount, Parts by Wt. | Sulfur Content, Per Cent |
|---|---|---|---|
|  | Mm. |  |  |
| 1 | 54-95/20 | 9 |  |
| 2 | 95-103/20 | 7 | 34.8 |
| 3 | 103/20 | 15 | 22.8 |
| Residue |  | 8 |  |

Analysis of fraction 3 shows it to contain 11.8% hydrogen and 66% carbon.

The cobalt sulfide catalyst used in the above examples is prepared by precipitating an aqueous solution of cobalt chloride with an equivalent amount of a solution of sodium trisulfide, separating the precipitate by filtration, washing first with water, and then with ethyl alcohol. The supernatant alcohol is removed by filtration, the residual alcohol is removed by heating the filter cake under reduced pressure, and the dried cobalt trisulfide is made into a paste with benzene to protect it from the air since it is pyrophoric.

The above examples serve to illustrate the principal features of the invention. The starting materials and the conditions of temperature, catalyst, reaction time, etc., are, however, subject to considerable variation within the scope of the invention. In its broader aspects the invention includes the production of sulfides by reacting an organic compound containing olefinic unsaturation with an organic disulfide.

The practice of this invention has been illustrated with ethylene and octene-1. Other olefins, such as propylene, butenes, pentene, hexene, cetene, cyclohexene, styrene and dihydronaphthalene may also be used. In addition to olefins there may be employed in this invention other ethylenic compounds, such as, for example: vinyl compounds, including vinyl chloride and ethyl vinyl sulfide allyl compounds, such as allyl alcohol, allyl amine, allyl sulfide; butene-2-thiol-1; 2-methylpentene-2-thiol-4; 2-chlorobutadiene-1,3; and the like.

While this invention has been illustrated with particular reference to dialkyl disulfides, e. g., di-n-butyl disulfide and diethyl disulfide, it is to be understood that it is not so limited and that any organic disulfide is operable therein. Included among examples of said organic disulfides are: dimethyl disulfide, dioctyl disulfide, didodecyl disulfide, dicyclohexyl disulfide, dibenzyl disulfide, polyethylene disulfide, diphenyl disulfide and dinaphthyl disulfide.

The reaction between the ethylenic compound and the disulfide is promoted by sulfactive hydrogenation catalysts. Generally, the hydrogenating heavy metal sulfides are suitable, especially those comprising the sulfides and polysulfides of the metals of groups 6 and 8 of the periodic table. Examples of catalyst compositions which are particularly efficient are the sulfides of cobalt, nickel, iron, molybdenum, tungsten, and chromium. Suitable catalysts can be prepared by precipitation methods in which a soluble salt of the metal such as cobalt is treated with a solution of sodium or ammonium polysulfide. Particularly active catalysts are obtained by treating a pyrophoric hydrogenating metal with a sulfiding agent such as hydrogen sulfide, sulfur, or organic compounds of bivalent sulfur at moderate temperatures. The latter process may be carried out conveniently in situ by charging the reactor with the free metal, together with the ethylenic compound and organic disulfide. The former will react with the latter with the formation of a sulfactive hydrogenation catalyst.

The above catalysts are active for the catalytic hydrogenation of sulfur in organic multisulfides, organic compounds having carbon to sulfur unsaturation, and organic sulfur compounds having sulfur to oxygen unsaturation. Such catalysts are referred to herein as sulfactive hydrogenation catalysts and are prepared as described in U. S. Patent Nos. 2,221,804 and 2,230,390.

In the practice of this invention, the preferred mode of operation involves heating the reactants together in a sealed reaction vessel. The pressure will depend upon the vapor pressure of the reactants and solvent, if any.

In general, the process is operable at temperatures within the range of from 125° C. to 250° C.

When the organic compound containing ethylenic unsaturation is not a liquid under the reaction conditions it is preferred to employ an inert solvent. Examples of suitable solvents are: saturated hydrocarbons, such as petroleum ether; and aromatic hydrocarbons, such as benzene. Other solvents that may be employed are ethers, such as diethyl ether, dioxane; alcohols, e. g., methanol, ethanol and butanol.

This invention constitutes a novel, useful, and economical process for preparing sulfides which are of considerable value as chemical intermediates, particularly for the preparation of surface-active agents, pesticides, therapeutic agents, plastics, etc.

As many apparently widely different embodiments of this invention may be made without departing from the spirit and scope thereof it is to be understood that I do not limit myself to the specific embodiments thereof except as defined in the appended claims.

Having described the present invention, the following is claimed as new and useful:

1. A process for cleaving the —S—S— group in dialkyl disulfides of the general formula R—S—S—R, wherein the R substituents are alkyl groups, which process comprises heating an olefin with an approximately equimolar amount of such a dialkyl disulfide in the presence of a sulfactive hydrogenation catalyst at a temperature within the range of from 125° C. to 250° C. under autogenous pressure.

2. The process in accordance with claim 1 wherein the catalyst is a sulfide of a metal of the iron group of the periodic table.

3. A process for cleaving the —S—S— group in di-n-butyl disulfide which comprises heating ethylene with an approximately equimolar amount of di-n-butyl disulfide in the presence of a sulfactive hydrogenation catalyst at a temperature within the range of from 125° C. to 250° C. under autogenous pressure.

4. A process for cleaving the —S—S— group in diethyl disulfide which comprises heating octene-1 with an approximately equimolar amount of diethyl disulfide in the presence of a sulfactive hydrogenation catalyst at a temperature within the range of from 125° C. to 250° C. under autogenous pressure.

5. A process in accordance with claim 1 wherein the catalyst is cobalt sulfide.

FRANK K. SIGNAIGO.

REFERENCES CITED

The following references are of record in the file of this patent:

UNITED STATES PATENTS

| Number | Name | Date |
|---|---|---|
| 2,031,529 | Elbel | Feb. 18, 1936 |
| 2,051,806 | Allen | Aug. 25, 1936 |
| 2,051,807 | Allen | Aug. 25, 1936 |
| 2,143,078 | Lyman | Jan. 10, 1939 |
| 2,278,127 | Patrick | Mar. 31, 1942 |

OTHER REFERENCES

Patrick: "Transactions of the Faraday Society," vol. 32, Jan. 1936, pages 347–356. (Copy in Div. 50.)

"Arkiv. Kemi, Mineral, Geol," 13 B. No. 14, 6 pages (1939).